April 12, 1932. D. LAKE 1,853,908
CLUTCH
Filed Aug. 5, 1929 4 Sheets-Sheet 1
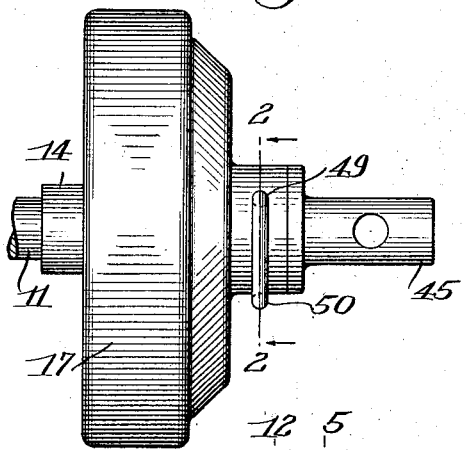
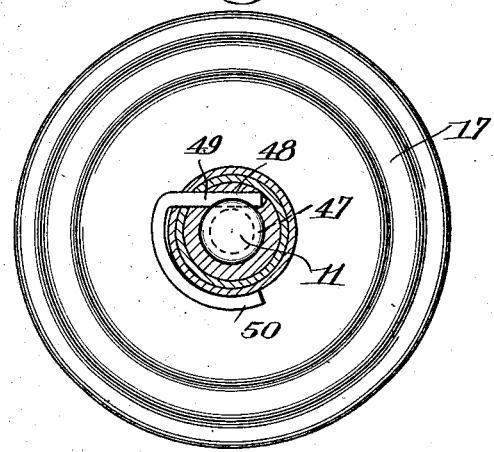
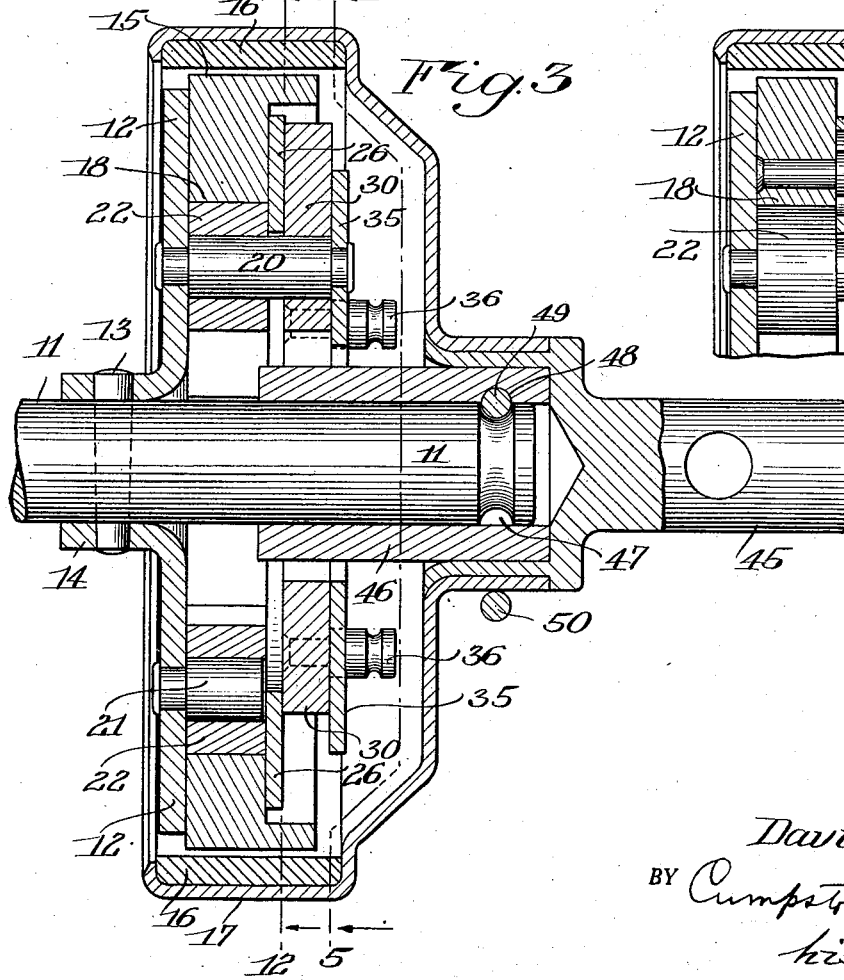
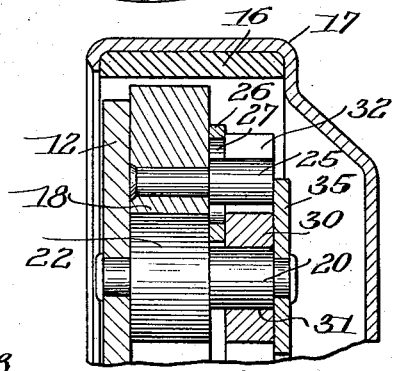
INVENTOR.
David Lake
BY Cumpston & Griffith
his ATTORNEYS April 12, 1932.   D. LAKE   1,853,908
CLUTCH
Filed Aug. 5, 1929   4 Sheets-Sheet 2

INVENTOR.
David Lake
BY Dempston & Griffith
his ATTORNEYS

April 12, 1932.  D. LAKE  1,853,908
CLUTCH
Filed Aug. 5, 1929  4 Sheets-Sheet 3
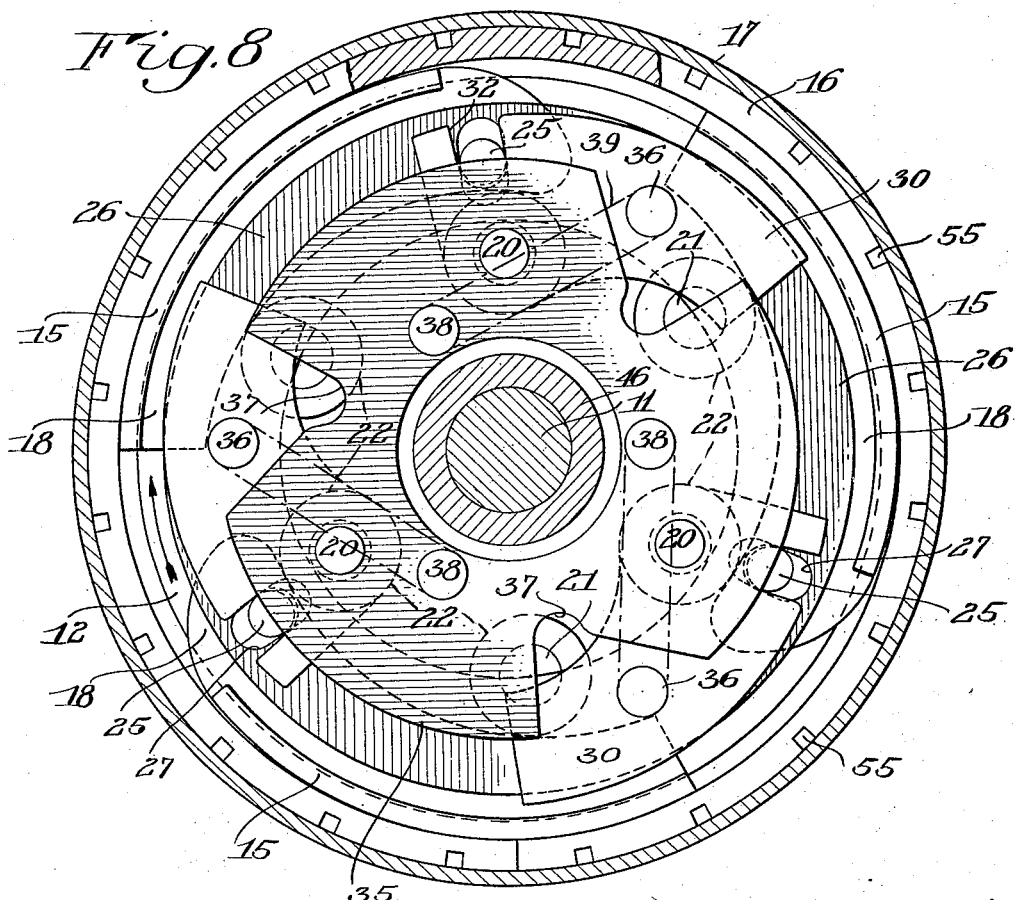
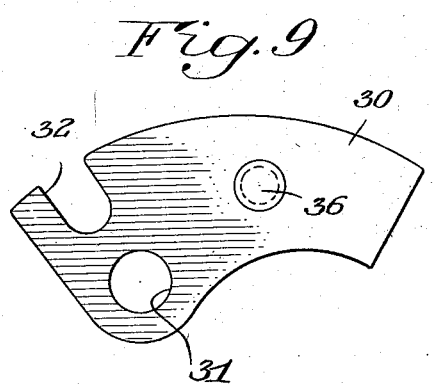
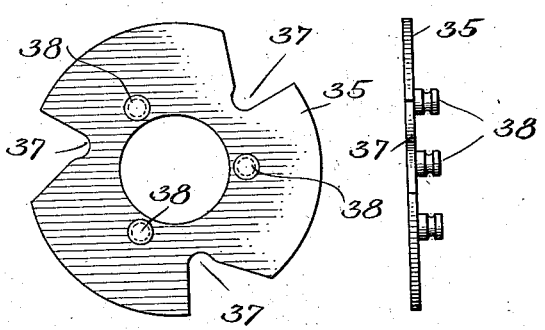
INVENTOR.
David Lake
BY Cumpston & Griffith
his ATTORNEYS April 12, 1932.　　　D. LAKE　　　1,853,908

CLUTCH

Filed Aug. 5, 1929　　　4 Sheets-Sheet 4

INVENTOR.
David Lake
BY Cumpston & Griffith
his ATTORNEYS

Patented Apr. 12, 1932

1,853,908

UNITED STATES PATENT OFFICE

DAVID LAKE, OF CLEVELAND HEIGHTS, CLEVELAND, OHIO, ASSIGNOR TO AUTOMATIC CLUTCH & MACHINE CO., INC., OF CLEVELAND, OHIO, A CORPORATION OF NEW YORK

CLUTCH

Application filed August 5, 1929. Serial No. 383,607.

This invention relates to a clutch, and has for one of its objects the provision of a clutch which will start its load smoothly and without jerking even though it is engaged when the driving member of the clutch is moving at high speed.

Another object is the provision of an improved and satisfactory clutch which will engage itself automatically when the driving member reaches a predetermined speed.

A further object is the provision of a generally improved and more satisfactory clutch which is smoother in starting, more uniform and reliable in operation, and which will transmit more power in proportion to its size than other clutches heretofore known.

To these and other ends the invention resides in certain improvements and combinations of parts, all as will be hereinafter more fully described, the novel features being pointed out in the claims at the end of this specification.

In the drawings:

Fig. 1 is a side elevation of a clutch embodying the invention;

Fig. 2 is a sectional elevation taken on line 2—2 of Fig. 1;

Fig. 3 is an enlarged sectional elevation taken on line 3—3 of Fig. 5;

Fig. 4 is a fragmentary sectional elevation taken on line 4—4 of Fig. 5;

Fig. 8 is a view similar to Fig. 3, showing the shoes in operating position;

Fig. 9 is a detailed view of one of the actuating weights for the shoes;

Fig. 10 is a detailed view of one of the weight retaining plates;

Fig. 11 shows the retaining plate as viewed from the left of Fig. 10;

Similar reference numerals throughout the several views indicate the same parts.

Figure 5:
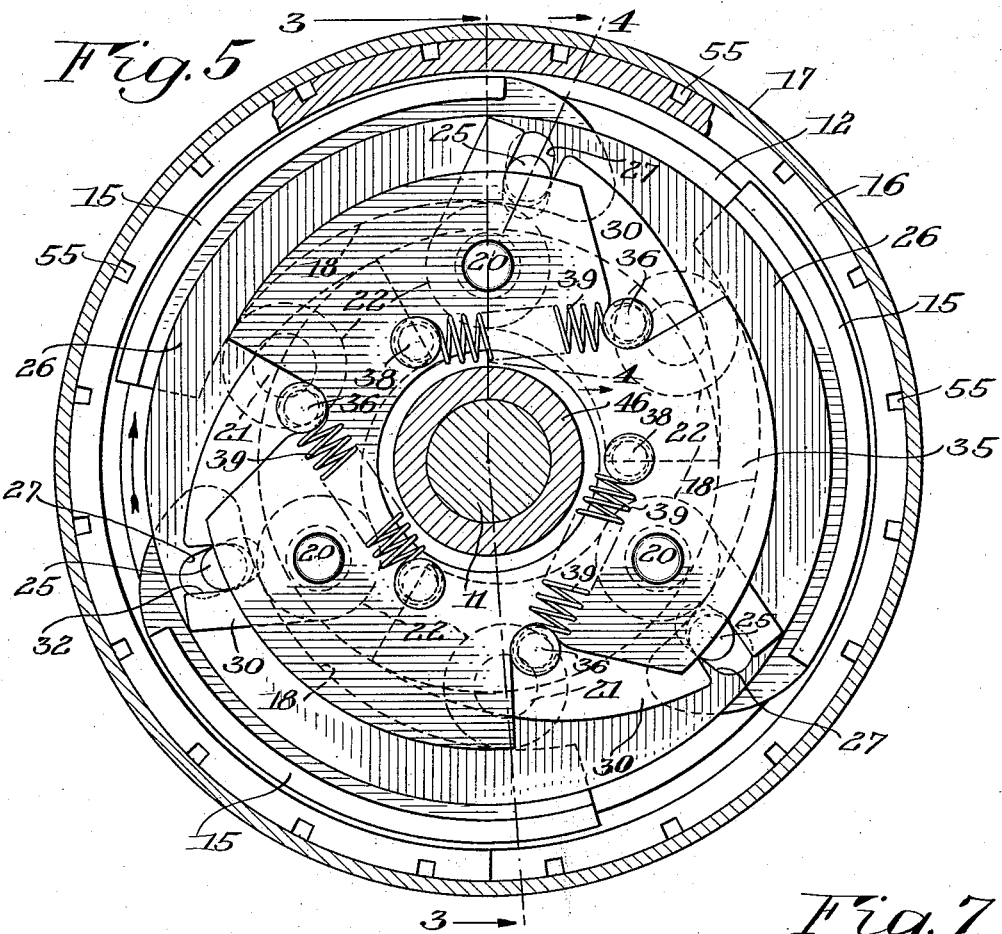
Fig. 5 is a transverse section taken on line 5—5 of Fig. 3.

When clutches are used in connection with certain types of machinery or appliances, it is essential that the clutches be so constructed that they will engage smoothly and start the load gradually, without jerking or jarring. For instance, compressors of various types, washing machines, and wire drawing machines, to mention only a few, should be started smoothly in order to obtain best results. The clutch of the present invention has been especially designed with smooth starting in view, and it has been found in actual use to give exceedingly favorable results.

It is desirable in many instances to provide clutches with automatic engaging means, operable centrifugally or otherwise. When such automatic means is used, it is ordinarily constructed to engage the clutch after the driving member has attained a considerable speed. Under such conditions, when the driving member is rotating with great rapidity, smoothness is of the greatest importance, since any jerkiness in the engaging action is magnified and quite pronounced on account of the high speed. The clutch of the present invention, however, is found in actual tests to engage smoothly and uniformly even under these conditions, and thus it is satisfactory for use in connection with many machines on which prior clutches do not give satisfactory results. Furthermore, the present clutch is exceptionally uniform and reliable in its engaging action, always engaging at the speed at which it is intended to engage, without substantial variations commonly found in prior clutches.

Referring now to the drawings, there is shown a driving shaft 11 which may be the armature shaft of a motor or may be driven in any other suitable way. A disk 12 is fixed to this driving shaft 11 by means of a pin 13 passing through an annular flange 14 on the disk 12 and into a hole in the shaft 11. Thus the disk 12 rotates with the driving shaft 11.

Figure 6:
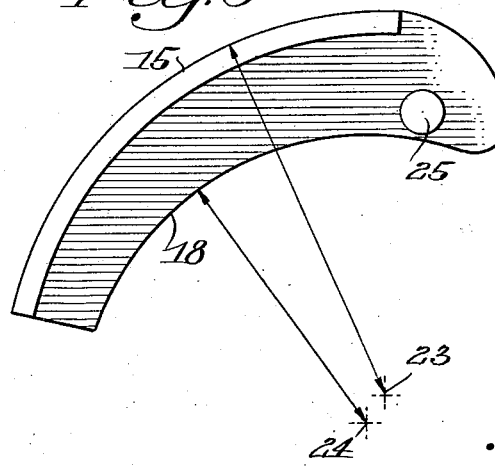
Fig. 6 is a detailed view of one of the clutch shoes.
Figure 7:
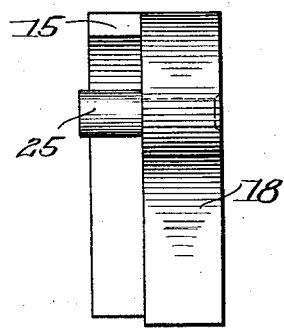
Fig. 7 is an end view of the shoe looking from the right of Fig. 6.
Figure 12:
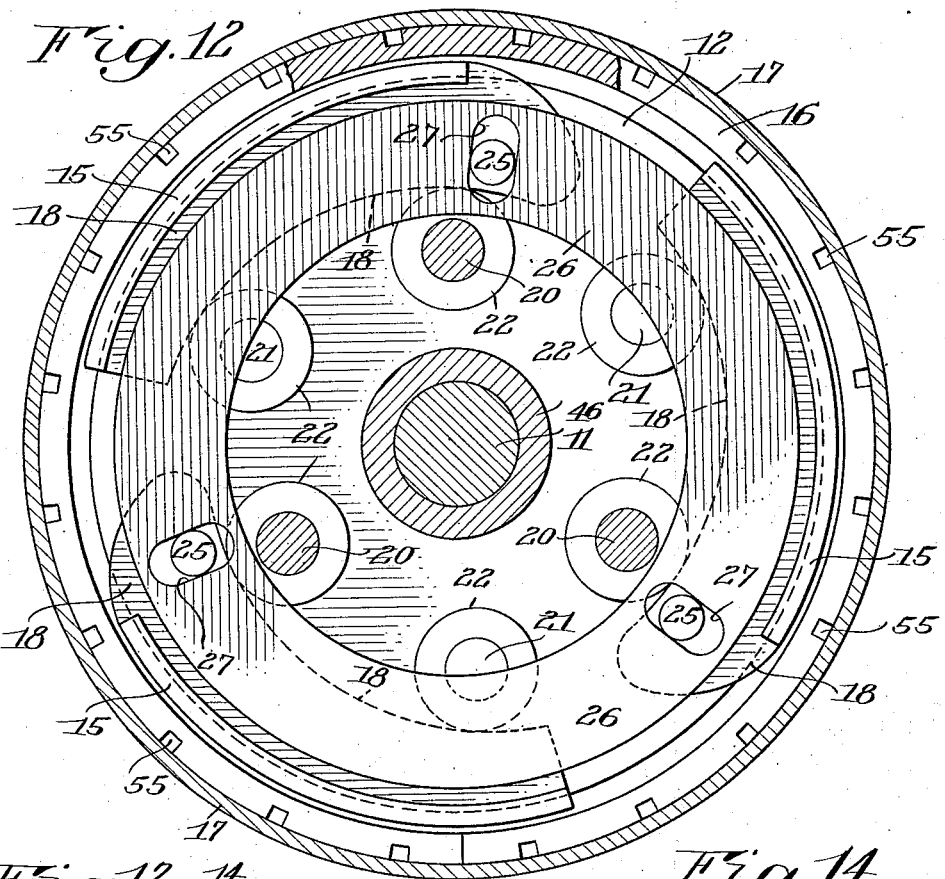
Fig. 12 is a sectional elevation taken on line 12—12 of Fig. 3.
Figure 13:
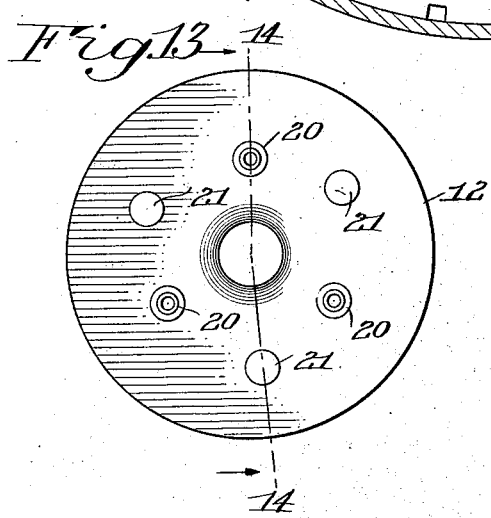
Fig. 13 is a detailed view of a driving disk shown applied at the left of Fig. 3.
Figure 14:
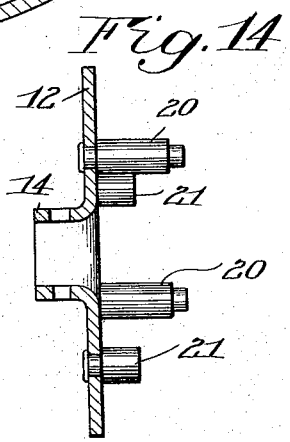
Fig. 14 is a section through the disk taken on line 14—14 of Fig. 13.

Movably mounted on the disk 12 is a plurality of clutching shoes 15. Three of such shoes are here shown, but the number may obviously be varied as desired. Each of these shoes has a wide outer face substantially in the form of a segment of a cylinder, for engaging a band 16 placed within an annular housing 17 which forms the driven member of the clutch, as will be described below. Each of these shoes 15 also has a comparatively thick flange 18 extending radially inwardly from its peripheral segmental flange, as best shown in Fig. 6.

Adjacent each of the shoes 15, and slightly inwardly from the flange 18 of the shoe, are long studs 20 and short studs 21 fixed to and projecting from the disk 12. On each of these studs is mounted a roller 22, and the shoes 15 are arranged so that the flanges 18 thereof contact with and may roll on these rollers 22.

The inner edge of the flange 18 of each shoe, which is the edge contacting with the rollers 22, is not concentric with the outer peripheral surface of the shoe, but is slightly eccentric relative thereto so that the shoe may be said to be slightly tapered or wedge shaped. In Fig. 6, the numeral 23 indicates the center of curvature of the outer peripheral surface of the shoe, which is the surface contacting with the driven portion of the clutch, while the center of curvature of the inner surface of the flange 18 is shown at the point 24.

The studs 20 near the thicker ends of the shoes are slightly closer to the center of the disk 12 than the studs 21 which are near the thinner end of the shoes. When the shoes have their flanges 18 in contact with the rollers 22, the outer periphery of each shoe will be substantially concentric with the axis of rotation of the disk 12. From the tapered construction of the shoes, it is obvious that if the shoes are moved circumferentially relative to the disk 12 in a counter-clockwise direction when viewed as in Fig. 8, the shoes will at the same time move outwardly so that the outer peripheral surfaces thereof will be farther from the axis of rotation. On the other hand, if the shoes be moved circumferentially in a clockwise direction relative to the disk 12, they will be withdrawn or moved inwardly closer to the axis of rotation. This circumferential movement of the shoes thus expands or contracts them, and causes them to engage or disengage the friction band or ring 16 extending annularly around the inside of an annular housing 17 which forms the driven member of the clutch.

In a clutch of this type, it is important that all of the shoes should move into or out of engagement substantially simultaneously, thus preventing a greater load being thrown on one shoe than on another, which would cause eccentric strains. In order to equalize the movements of all of the shoes, each shoe is provided near what might be termed its thicker end with a stud 25, and an equalizing member such as the annular compensating ring 26 is provided with slots 27 in which these studs 25 are received. The slots 27 have a width in a circumferential direction just sufficient to receive the studs 25, but in a radial direction these slots are elongated to allow the studs 25 to move in and out toward or away from the axis of rotation of the clutch during their circumferential movement. It is apparent that this compensating ring 26 makes all of the shoes 15 move together, so that they are all equally expanded. Hence all of them engage the friction band 16 substantially simultaneously.

Preferably the shaft 11 is driven in a clockwise direction when viewed as in Fig. 5. Hence the friction between the driven member 17 and the shoes 15 on the rotating driving member will tend to move these shoes in a counter-clockwise direction relative to the disk 12. Such direction of movement of the shoes is the direction which causes them to expand or move outwardly from the axis of rotation. Thus it follows that when the clutch is once engaged, slippage of the clutch tends to engage the shoes still more firmly, so that the greater the load on the clutch, the greater is the pressure between the shoes and the driven member. This construction results in a clutch which is able to transmit a very large amount of power in proportion to its size.

Various means may be employed for controlling the circumferential movements of the shoes 15 relative to the disk 12, in order to engage or disengage the clutch. In the present instance, it is preferred to provide automatic controlling means, working on the centrifugal principle, so that the clutch will be automatically engaged when the driving member reaches a predetermined speed, and will be automatically disengaged when the driving member falls below a predetermined speed. It is obvious, however, that the same principle of shoes moving circumferentially and expanding outwardly, and also various other features of the construction, may be employed with a manual or other non-automatic control, and the use of the clutch with such other forms of control is distinctly contemplated.

The preferred centrifugal control comprises three weight members 30, best shown in Fig. 9, each of which has a hole 31 which fits over one of the long studs 20, so that each of these long studs carries the weight 30 pivotally mounted thereon. Each weight 30 also has a notch 32 which embraces the stud 25 on the adjacent shoe 15, it being understood that the stud 25 is sufficiently long so that it projects upwardly through the slot 27 of the ring 26 and into the notch 32. The main body of each weight 30 extends somewhat circumferentially for some distance from its pivot 20, and it is of sufficient mass so that centrifugal force during rotation of the clutch will have a strong tendency to move the weight outwardly, which will cause it to turn in a counter-clockwise direction about its pivot 20, when viewed as in Fig. 5. This counter-clockwise movement of the weight will act upon the studs 25 to move the shoes 15 circumferentially in a counter-clockwise direction, so that the shoes will travel upon the rollers 22 and be expanded to engage the driven member, thus engaging the clutch. All of the shoes will have to move together and through the same distance, because of the equalizing member 26.

A retaining plate 35, having the shape best shown in Fig. 10, overlies the weights 30 and retains them in position, the plate being held in place by being set on the ends of the long studs 20 and having the ends of the studs riveted over the outer surface of the plate 35. Each weight 30 is provided with a spring stud 36 projecting upwardly to a point above the surface of the plate 35, and this plate 35 is provided with notches 37 so that these studs 36 may move freely in and out when the weights move to engage or disengage the clutch. The retaining plate 35 carries three spring studs 38 projecting from the outer face thereof, and to each of these studs there is fastened one end of a coiled spring 39, the other end of the spring being fastened to the stud 36 on one of the weights 30. It is apparent that as the weights move outwardly to clutch engaging position, the springs 39 will be stretched, and the speed at which the clutch automatically engages accordingly depends principally upon the mass and shape of the weights 30 and the strength of the springs 39. The weights 30 and the springs 39 may thus be varied as desired in order that the clutch may have any desired speed. Of course, in addition to the centrifugal action of the weights 30, centrifugal force acts also directly on the shoes 15, so that regardless of the weights there is some tendency for the shoes to move outwardly and engage the driven member.

A shaft 45 is preferably fixed to the driven housing 17, this shaft being the driven shaft, and it is suitably connected to the machine or appliance to which power is being supplied. Preferably a bearing bushing 46 is fixed in the driven housing 17, and surrounds the end of the driving shaft 11, as shown in Fig. 3, to insure accurate axial alinement of the driving parts with the driven parts. To prevent longitudinal displacement of the driven member relative to the driving member, the driving shaft 11 may have a circumferential groove 47 near its end, and a hole 48 is formed through the bearing bushing 46 and the housing 17 in such position that when a pin 49 is inserted in this hole 48, the pin will lie partially in the groove 47, thus holding the driven parts in position on the shaft 11. The end of the retaining pin 49 may be conveniently bent part way around the hub of the housing 17 as at 50 to form a spring clip, so that the pin is readily removable from its hole 48 when it is desired to take the clutch apart. When retaining means such as this pin 49 and groove 47 is employed, the driven parts 16, 17, 45, and 46 may be entirely carried by the shaft 11 without other support, which arrangement is especially convenient when it is desired to connect the shaft 45 to flexible shafting.

The construction of the friction band 16, which has previously been mentioned in passing, is of considerable importance in the proper functioning of the clutch. It is preferably made of material such as molded asbestos brake lining, although other materials such as krome leather or pressed cork might be employed. When molded asbestos lining or other relatively hard material is employed, it is preferable to notch or groove the exterior periphery thereof at short intervals around its circumference, these grooves preferably extending approximately half way through the thickness of the band. Such grooves are shown at 55 in Fig. 8. These grooves make the relatively hard material of the band sufficiently flexible so that it can conform closely to any irregularities in the surface of the member 17. It is found by actual test that a given clutch will transmit approximately twice as much power when the band is grooved or notched on its outer surface as above described, as it will if no such notches are provided.

It is to be understood that the band 16 is loose or "floating" in the housing 17, and is free to move circumferentially around the housing. Of course, when the clutch is fully engaged, there will be little or no movement between the band 16 and the housing 17, because the shoes 15 will press the band 16 against the housing so tightly that friction prevents such movement. But when the clutch is being engaged, the band is free to slip somewhat in the housing, and at the same time the shoes 15 may slip somewhat over the band, which results in an extremely smooth and vibrationless starting, even at quite high speeds. Clutches have been made according to this invention which are so proportioned that they engage automatically at a speed of approximately 1500 revolutions per minute, and such clutches during repeated tests under varying conditions have functioned perfectly, starting the load with remarkable smoothness.

In these clutches, when the speed of the driving shaft falls to a point slightly below the speed at which the clutch automatically engages, the springs 39 will automatically disengage the clutch.

It is obvious that the housing 17 might be

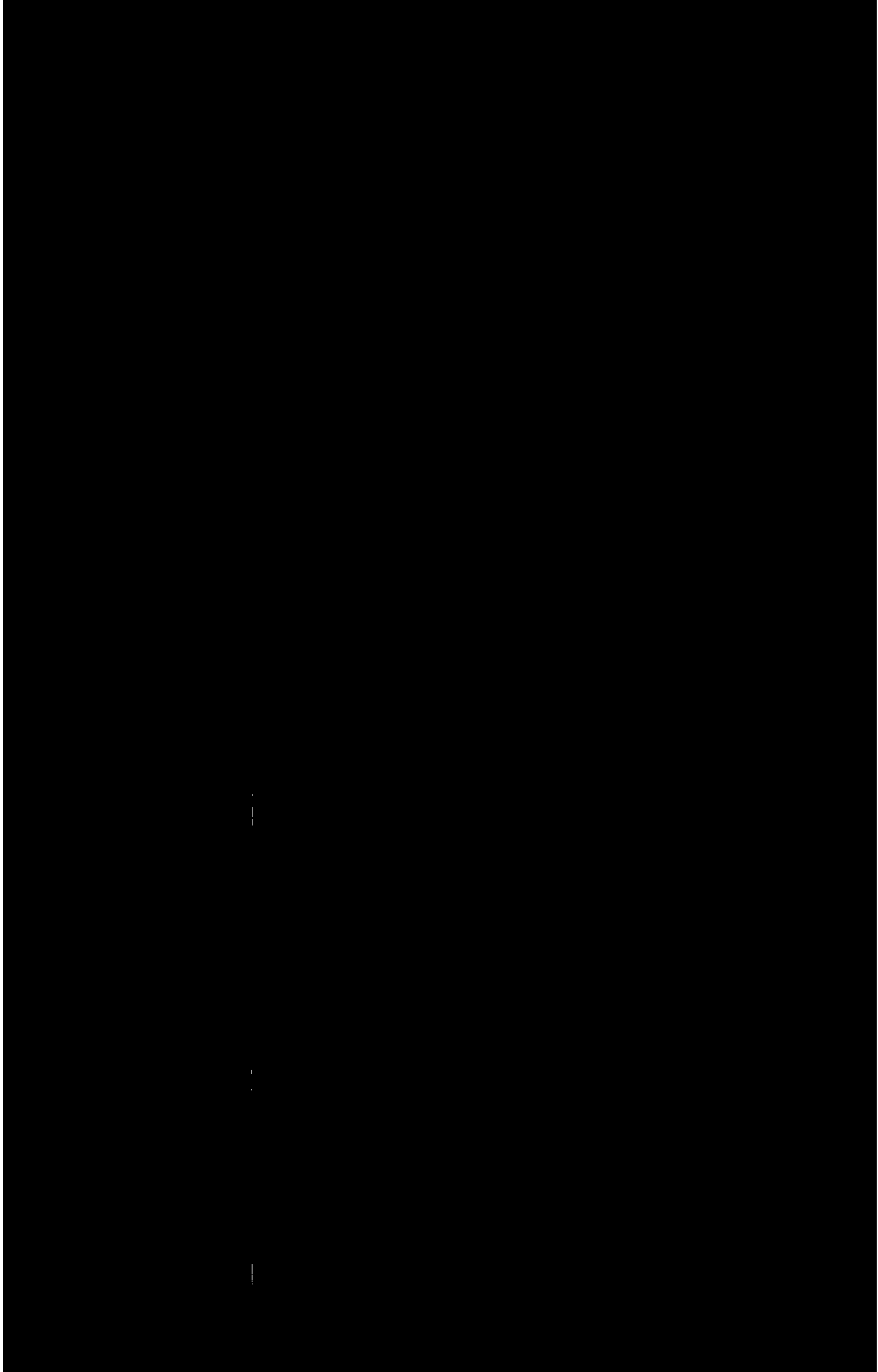

shoes, each of said elements being connected to one of said studs, and an equalizing ring connected to said studs for substantially equalizing the movement of the different shoes.

12. In a clutch, the combination with a driving member, of a driven member, a plurality of studs mounted on said driving member, a plurality of shoes guided by said studs for movement into and out of cooperative relation with said driven member, and a plate mounted on said studs overlying said shoes to retain said shoes in position.

13. In a clutch, the combination with a driving member, of a driven member, a plurality of studs mounted on said driving member, a plurality of shoes guided by said studs for movement into and out of cooperative relation with said driven member, an equalizing member connected to each of said shoes to equalize the movement of the different shoes, and a plate mounted on said studs to retain said shoes in cooperative relation to said studs and said equalizing member in cooperative relation to said shoes.

14. In a clutch, the combination with a driving member, of a driven member, a plurality of studs mounted on said driving member, a plurality of shoes guided by said studs for movement into and out of cooperative relation with said driven member, centrifugal controlling elements mounted on certain of said studs for controlling movement of said shoes, and a retaining member also mounted on said studs for retaining said shoes in cooperative relation to said studs and said controlling elements in cooperative relation to said shoes.

15. In a clutch, the combination with a driving member, of a driven member, a plurality of studs mounted on said driving member, a plurality of shoes guided by said studs for movement into and out of cooperative relation with said driven member, an equalizing member connected to each of said shoes to equalize the movement of the different shoes, centrifugal controlling elements mounted on certain of said studs for controlling movement of said shoes, and a retaining member also mounted on said studs for retaining said shoes in cooperative relation to said studs and retaining said equalizing member and controlling elements in cooperative relation to said shoes.

16. In a clutch, the combination with a driving member, of a driven member, a stud mounted on said driving member, a shoe guided by said stud for movement into and out of cooperative relation with said driven member, a centrifugal controlling element for controlling movement of said shoe, a retaining member mounted on said stud for retaining said shoe in cooperative relation to said stud and driving member and retaining said controlling element in cooperative relation to said shoe, and a coiled spring connected at one end to said retaining member and at the other end to said controlling element.

17. In a clutch, the combination with a driving member including a disk-like portion, of a driven member, a plurality of studs mounted on said disk-like portion and projecting therefrom, rollers mounted on said studs, a plurality of shoes guided by said rollers for movement into and out of cooperation with said driven member, an equalizing ring connected to said shoes to equalize the movement of the different shoes, controlling elements mounted on certain of said studs for controlling the movements of said shoes, and retaining means mounted on said studs for retaining said rollers, shoes, equalizing ring, and controlling elements in cooperative relation to each other.

DAVID LAKE.